United States Patent
Schiessling et al.

(10) Patent No.: US 11,769,626 B2
(45) Date of Patent: Sep. 26, 2023

(54) ELECTROMAGNETIC DEVICE EQUIPPED WITH AT LEAST ONE WIRELESS SENSOR

(71) Applicant: Hitachi Energy Switzerland AG, Baden (CH)

(72) Inventors: Joachim Schiessling, Enköping (SE); Cecilia Forssén, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/922,711

(22) PCT Filed: Jan. 18, 2021

(86) PCT No.: PCT/EP2021/050961
§ 371 (c)(1),
(2) Date: Nov. 1, 2022

(87) PCT Pub. No.: WO2021/228439
PCT Pub. Date: Nov. 18, 2021

(65) Prior Publication Data
US 2023/0178297 A1   Jun. 8, 2023

(30) Foreign Application Priority Data
May 13, 2020   (EP) .................................. 20174319

(51) Int. Cl.
*H01F 27/40*   (2006.01)
*H01F 27/32*   (2006.01)

(52) U.S. Cl.
CPC ........... *H01F 27/402* (2013.01); *H01F 27/32* (2013.01); *H01F 2027/406* (2013.01)

(58) Field of Classification Search
CPC ........ H01F 27/12; H01F 27/32; H01F 27/402; H01F 2027/406

USPC .......................................................... 361/41
See application file for complete search history.

(56) References Cited

U.S. PATENT DOCUMENTS

| | | | |
|---|---|---|---|
| 2002/0107657 A1* | 8/2002 | Fantana | H01F 27/402 |
| | | | 702/140 |
| 2008/0197977 A1* | 8/2008 | Wada | H01F 27/36 |
| | | | 340/646 |

(Continued)

FOREIGN PATENT DOCUMENTS

| | | |
|---|---|---|
| CN | 101521095 A | 9/2009 |
| CN | 102891042 A | 1/2013 |

(Continued)

OTHER PUBLICATIONS

Indian Office Action, Indian Application No. 202247064235, dated Jan. 19, 2023, 6 pages.

(Continued)

*Primary Examiner* — Yemane Mehari
(74) *Attorney, Agent, or Firm* — Sage Patent Group

(57) ABSTRACT

An electromagnetic device comprises an enclosure, at least one winding in the interior of the enclosure, at least one wireless sensor attached to the winding for sensing at least one property or deficiency of the electromagnetic device and at least one active communication unit comprising transceiving circuitry and at least one antenna, wherein the transceiving circuitry is placed on the exterior of the enclosure and the least one antenna is placed inside the enclosure for communication with the at least one sensor, wherein the at least one sensor comprises at least one sensor attached to the winding, and wherein the at least one sensor attached to the winding is a printed electronic sensor comprising electronics printed on an insulating substrate, where the substrate faces the at least one winding.

13 Claims, 3 Drawing Sheets

(56) References Cited

U.S. PATENT DOCUMENTS

| | | | |
|---|---|---|---|
| 2010/0211334 A1 | 8/2010 | Sheikman | |
| 2019/0027292 A1* | 1/2019 | Findeisen | ............... H01F 27/08 |
| 2019/0074729 A1 | 3/2019 | Wittenberg et al. | |
| 2019/0170539 A1 | 6/2019 | Howard et al. | |

FOREIGN PATENT DOCUMENTS

| | | | | |
|---|---|---|---|---|
| CN | 108267171 A | 7/2018 | | |
| CN | 108322899 A | 7/2018 | | |
| CN | 208188197 U | 12/2018 | | |
| DE | 2427830 A1 | 1/1975 | | |
| DE | 10060520 A1 * | 6/2002 | ........... | H01F 27/263 |
| DE | 10060520 A1 | 6/2022 | | |
| EP | 3521782 A1 | 8/2019 | | |
| GB | 1470692 A | 4/1977 | | |
| JP | 6552779 B1 | 7/2019 | | |
| WO | 0247096 A1 | 6/2002 | | |

OTHER PUBLICATIONS

Korean Office Action, Korean Patent Application No. 10-2022-7039662, dated Jan. 6, 2023, 17 pages.
International Search Report and Written Opinion of the International Searching Authority, PCT/EP2021/050961, dated Mar. 25, 2021, 14 pages.
Chinese Office Action, Chinese Patent Application No. 201800346510, dated Apr. 8, 2023, 7 pages.

* cited by examiner

ELECTROMAGNETIC DEVICE EQUIPPED WITH AT LEAST ONE WIRELESS SENSOR

CROSS REFERENCE TO RELATED APPLICATIONS

This application is a 35 U.S.C. § 371 national stage application of PCT International Application No. PCT/EP2021/050961 filed on Jan. 18, 2021, which in turn claims priority to European Application No. 20174319.2, filed on May 13, 2020, the disclosures and content of which are incorporated by reference herein in their entireties.

TECHNICAL FIELD

The present disclosure generally relates to electromagnetic devices. The disclosure more particularly relates to an electromagnetic device that is equipped with at least one wireless sensor.

BACKGROUND

Electromagnetic devices, such as transformers and reactors, are important devices in various power delivery environments such as in power transmission and distribution systems. These electromagnetic devices may then operate at high voltage levels and may thus experience high electric potentials and strong electrical fields.

It is in many cases of interest to measure various properties of and deficiencies in such electromagnetic devices, such as the temperature, moisture and/or partial discharges in insulation. For this reason, it may be of interest to place one or more sensors inside the electromagnetic device.

Sensors that communicate using conductors are often not suitable, because they may compromise the electrical insulation. One frequently used alternative is the optical fiber. However, these are often expensive. It may also be complicated to manufacture an electromagnetic device with a fiber, especially if the electromagnetic device is to comprise solid insulation. In addition, there is a risk that the fibers disturb the electrical insulation.

It is therefore of interest to use an alternative sensor realization.

One type of sensor that has been used in bushings is a wireless sensor. One example of this can be found in EP 3521782, where wireless sensors are interleaved between layers of solid insulation.

US2002/107657 A1 discloses an apparatus for measuring contact pressure exerted by a winding compression element on a winding in a power transformer in a tank. A checking antenna in the tank is connected to the checking device via a radio frequency bushing, which passes through the wall of the tank.

DE2427830 A1 discloses a winding of a transformer. An antenna of the radio transmitter is inserted between insulating layers of paper and runs along the circumference of a static protective ring. An electric heat sensor, e.g., a thermistor, is soldered to the conductor of the winding or inserted between parallel conductors of the winding 7.

US2008/197977 A1 discloses an IC sensor which may be placed near a winding, the sensor having an electrostatic shield, or the sensor being positioned and oriented in weak regions of the electromagnetic field.

DE10060520 A1 discloses a SAW sensor arranged on a yoke bolt. An antenna is provided to communicate with interrogation electronics outside a tank.

Many electromagnetic devices comprise enclosures that enclose windings. These enclosures may impede wireless transmission. It may therefore be difficult to transmit signals to and receive signals from the interior of the enclosure. The interior of the enclosure may at the same time not be a suitable environment for sensitive communication equipment.

There is therefore a need for improvement in relation to the use of sensors in electromagnetic devices. The present disclosure addresses at least some of the above-mentioned problems.

SUMMARY

One object of the present disclosure is to improve communication in an electromagnetic device that is equipped with at least one wireless sensor.

This object is according to a first aspect obtained through an electromagnetic device comprising:
- an enclosure,
- at least one winding in the interior of the enclosure,
- at least one wireless sensor for sensing at least one property or deficiency of the electromagnetic device, and
- at least one active communication unit comprising transceiver circuitry and at least one antenna,
- wherein the transceiver circuitry is placed on the exterior of the enclosure and the least one antenna is placed inside the enclosure for communication with the at least one sensor,
- wherein the at least one sensor comprises at least one sensor attached to the winding, and
- wherein the at least one sensor attached to the winding is a printed electronic sensor comprising electronics printed on an insulating substrate, where the substrate faces the at least one winding.

The electromagnetic device may be provided for high-voltage applications, such as applications of 1 or 10 kV or higher.

The at least one sensor may comprise at least one sensor attached to the winding. Such an attached sensor may comprise a printed electronic sensor comprising electronics printed on an insulating substrate, where the substrate faces the at least one winding. The at least one winding may in turn comprise an enameled winding comprising a conductor surrounded by solid insulation.

The insulating substrate may have a thickness in a range of 50-10 μm. The thickness of the print electronics may further be less than 10 μm.

The electromagnetic device may also comprise insulation surrounding the winding. The at least one winding may thus be surrounded by insulation.

The insulation surrounding the winding may comprise solid insulation. In addition to the solid insulation surrounding the conductor in the winding, the electromagnetic device may thus comprise further solid insulation, for instance between two different windings. The at least one sensor may in this case be placed between the solid insulation, for instance in the form of a sheet, and a corresponding winding.

The solid insulation may fill the entire enclosure. Alternatively, the electromagnetic device may comprise fluid insulation in the enclosure, which fluid insulation may be provided instead of or in addition to the solid insulation. The fluid insulation may comprise liquid insulation and/or gas insulation. The fluid insulation may thus be in the form of a gas and/or a liquid.

The at least one antenna may be directed towards at least one corresponding sensor. This may be beneficial for the communication efficiency. Another way to improve the communication efficiency may be obtained through optimizing the distance between a sensor and a corresponding winding conductor. The sensor may be placed at a distance from a corresponding winding conductor that improves the communication efficiency.

The enclosure may be a metallic enclosure. The at least one active communication unit may be placed at the top of the enclosure and at least one sensor may be placed at a top end of a winding, which top end may be an end that is closest to the active communication unit. The at least one antenna may be casted in a material able to withstand high temperatures, for instance of up to about 170° C.

The electromagnetic device may additionally comprise a core with a yoke, where the core defines a central axis around which the at least one winding is wound and the yoke may extend in a direction at right angles to the central axis. Thereby a winding structure formed by the at least one winding is divided in two halves. In this case it is additionally possible that the at least one active wireless communication unit and at least one sensor with which it is to communicate are displaced from and placed at the same side of the yoke in the direction of the yoke. They may more particularly be placed on the same side of the yoke in the vertical direction.

The least one sensor may be configured to measure a property or deficiency of insulation in the enclosure, which may be a property or deficiency of the solid and/or the fluid insulation.

The at least one wireless sensor may comprise a passive wireless sensor. The at least one wireless sensor may additionally or instead comprise an active wireless sensor. When the at least one wireless sensor comprises an active wireless sensor the electromagnetic device may further comprise an energy harvesting unit connected to and configured to power the active wireless sensor.

The present disclosure has a number of advantages. The printed sensor may have a relatively large surface as compared to the thickness of the substrate. Due to the flexibility of the substrate, the sensor may bend and follow a circumferential surface of the winding. Thereby, any printed circuits/electronics on the substrate will follow the equipotential lines of an electric field generated by the winding so that different parts of the circuits are not exposed to different electric potentials.

The disclosure also allows wireless communication to be carried out in the interior of the enclosure. Through placing the transceiver circuitry outside of the enclosure, it does not need to be protected against the environment inside the enclosure. It is also easier to apply cooling of the transceiver circuitry if this is needed. As the at least one antenna is placed inside the enclosure communication therein is improved.

BRIEF DESCRIPTION OF THE DRAWINGS

The present disclosure will in the following be described with reference being made to the accompanying drawings, where.

DETAILED DESCRIPTION OF THE INVENTION

Embodiments of the disclosure are discussed in detail below. In describing embodiments, specific terminology is employed for the sake of clarity. However, the disclosure is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the disclosure.

The present disclosure generally concerns electromagnetic devices such as inductors and transformers.

Figure 1:
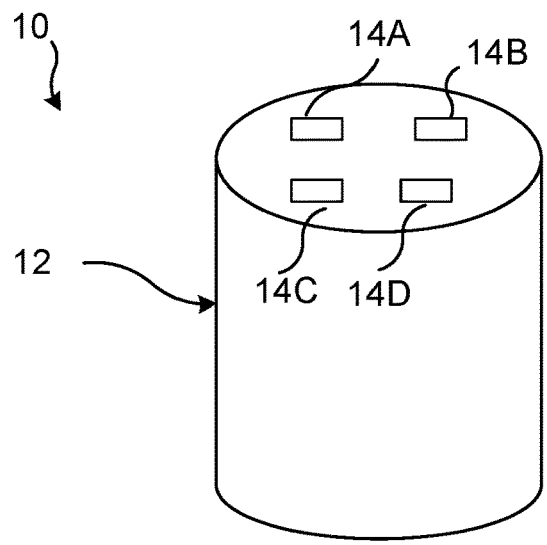
FIG. 1 schematically shows an electromagnetic device comprising an enclosure with active wireless communication units.

FIG. 1 shows a perspective view of a schematic electromagnetic device 10 that may be realized as a transformer, for instance a transformer for high-voltage applications, such as applications of 1 or 10 kV or higher. The electromagnetic device 10 comprises an enclosure 12. It also comprises at least one electrical winding (not shown) and this winding is placed inside or in the interior of the enclosure 12, the exterior of which is shown in the figure. The enclosure 12 is also equipped with at least one first active communication unit. In the example shown in FIG. 1, there are four active communication units 14A, 14B, 14C and 14D, which are placed in the top of the enclosure 12, which top may be in the highest vertical position of the enclosure 12. The enclosure 12 may be provided as a tank with a lid. In this case the active communication units 14A, 14B, 14C and 14D may be placed in the lid of the tank.

Figure 2:
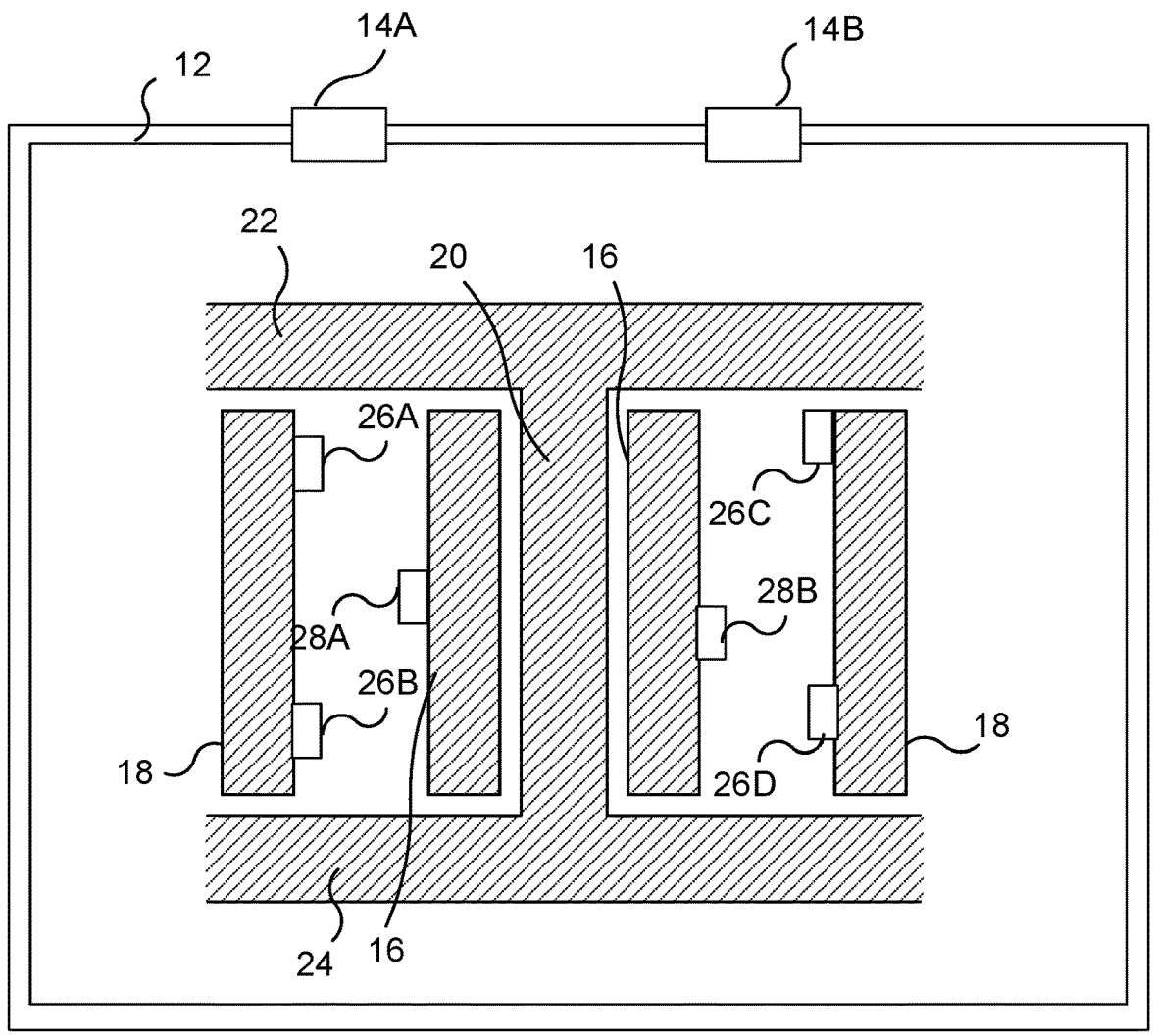
FIG. 2 schematically shows a cross-section through the enclosure with active wireless communication units, where the enclosure comprises an outer and an inner winding equipped with wireless sensors and being wound around a core equipped with yokes.

FIG. 2 shows a schematic sectional view of the enclosure 12 from FIG. 1 so that its interior can be seen.

As can be seen in FIG. 2, the transformer has a cylindrical shape and comprises a number of windings wound around a core 20 in the interior of the enclosure 12. There is here an inner winding 16, which may be a low voltage winding, and outside of this inner winding 16 there is an outer winding 18, which may be a high voltage winding. The core 20 thereby forms or defines a vertical central axis around which the inner winding 16 and the outer winding 18 are wound, where the outer winding 18 is wound outside of the inner winding 16 The windings are thus provided concentrically around the transformer core 20. It should here be realized that there may be more windings in the structure, such as a third winding. It should also be realized that the transformer may be a three-phase transformer comprising three cores, around which windings are wound.

An upper end of the core 20 is joined with a first yoke 22 and a lower end of the core 20 is joined with a second yoke 24. The upper end of the core 20 is thereby at a highest vertical position joined to the first yoke 22 and at a lowest vertical position joined to the second yoke 24, where the yokes may both extend in the horizontal direction. A yoke may thus extend in a direction at right angles to the central axis.

The electromagnetic device also comprises at least one sensor attached to the at least one winding. The windings of FIG. 2 are thus provided with sensors. There is in this case a first group of sensors 26A, 26B, 26C and 26D placed on the outer winding 18 and a second group of sensors 28A and 28B placed on the inner winding 16. The sensors are all wireless sensors.

Two of the active wireless communication units 14A and 14B are also shown. As can be seen in the figure the active wireless communication units 14A and 14B have a part placed on the exterior or outside of the enclosure 12 and a part that is placed in the interior or inside the enclosure 12. Thereby the active communication units 14A and 14B are able to communicate with the sensors 26A, 26B, 26D, 28A, 28B in the enclosure 12 as well as with other devices outside of the enclosure 12. The active communication units 14A and 14B are furthermore placed at the top of the enclosure 12 and a sensor 26C is with advantage placed at a top end of a winding, here the outer winding 18, which top end is closest, in the vertical direction, to the active communication units 14A and 14B. This may be of interest because the temperature of the winding may be high at the top end.

Figure 3:
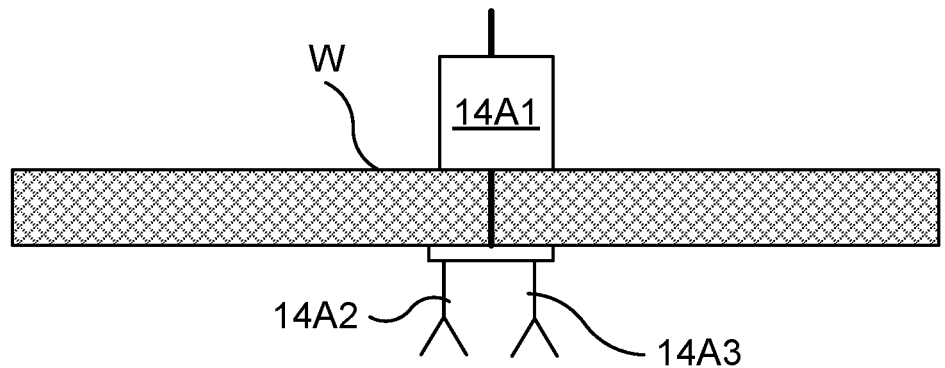
FIG. 3 schematically shows the realization of an active wireless communication unit through a wall of the enclosure.

FIG. 3 schematically shows the realization of a first active wireless communication unit. The active wireless communication unit 14A comprises transceiver circuitry 14A1 and at least one antenna. Moreover, in this realization the transceiver circuitry 14A1 is placed on the exterior of the enclosure. It may more particularly be placed on an outer surface of a wall W of the enclosure, i.e., on an external surface of the wall W that faces away from the interior of the enclosure. The least one antenna is on the other hand placed inside the enclosure for communication with the at least one sensor. In this example the active wireless communication unit 14A comprises two antennas 14A2 and 14A3. These antennas 14A2 and 14A3 are placed on an inner surface of the wall W, i.e., in the interior of the enclosure. A feed-through, as an example realized as at least one conductor, runs through the wall W and interconnects the transceiver circuitry 14A1 with the antennas 14A2 and 14A3. It should here be realized that as an alternative the active communication unit may comprise only one antenna as well as more antennas. The antennas may additionally be cast in a material able to withstand high temperatures, for instance of up to about 170° C.

The enclosure is typically a metallic enclosure. It is thus formed of a metallic material, such as steel, and through placing the antennas in the enclosure, it is possible to carry out wireless communication in the interior of the enclosure. The interior of the enclosure may be a harsh environment. Through placing the transceiver circuitry outside of the enclosure the transceiver circuitry does not need to be protected against this environment. It is also easier to apply cooling of the transceiver circuitry if this is needed.

Figure 4:
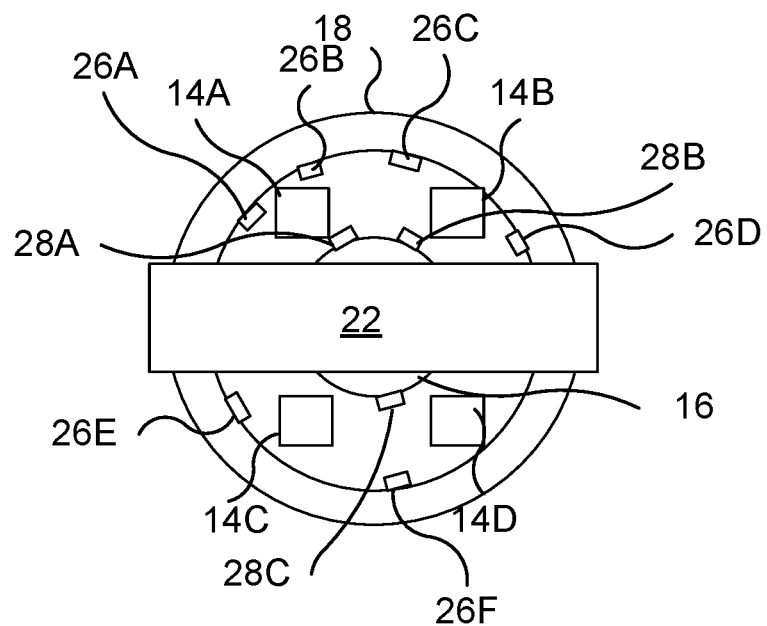
FIG. 4 schematically shows a view from above of the active wireless communication units, wireless sensors, windings and one of the yokes from FIG. 3.

FIG. 4 schematically shows a view from above of the transformer, the active communication units 14A, 14B, 14C and 14D and the first yoke 22. As can be seen the outer winding 18 is equipped with the first group of sensors, as an example comprising six sensors 26A, 26B, 26C, 26D and 26E, while the inner winding 16 is equipped with the second group of sensors, as an example comprising four sensors 28A, 28B and 28C. The sensors in the first group are in this case placed on an inner side of the outer winding 18. They thereby face inwards towards the inner winding 16 and the central axis of the transformer. The sensors 28A, 28B, 28C on the inner winding 16 in turn face outwards towards the outer winding 18. They thus face away from the central axis. It should also here be realized that there may be fewer or more sensors on the windings.

As can be seen from FIG. 4, the active communication units 14A, 14B, 14C and 14D are vertically separated from the first yoke 22. They also cover different areas of the transformer. The yokes may be seen as dividing the winding structure of the transformer into two halves, where each half is served by at least one active communication unit and in this case by two active communication units. One pair of active wireless communication units 14A and 14B thereby communicate with sensors 26A, 26B, 26C, 26D, 28A, 28B in a first half on one side of the first yoke 22 and another pair of active wireless communication units 14C and 14D communicate with sensors 26E, 26F, 28C in a second half on another side of the first yoke 22. It should be realized that it is possible that only one active wireless communication unit serves such a half. Thereby an active wireless communication unit and at least one sensor with which it is to communicate are displaced from and placed at the same side of the yoke in the direction of the yoke. In this case they are placed on the same side of the yoke in the vertical direction. Moreover, the winding structure is typically cylindrical. Through providing four active wireless communication units, each active wireless communication unit can serve a quarter of the volume occupied by the transformer structure in the vertical direction. Through this placing of the active communication units it is ensured that the first yoke 22 does not block any communication between a sensor and an active communication unit. Through providing more than one active communication unit on each side of the first yoke 22, it is also ensured that the number of sensors served by an active communication unit is limited. There are alternatives to providing active wireless communication units on the top of the enclosure. It is for instance possible that the active wireless communication units are placed in the bottom instead. In this case the vertical displacement may be such that the second yoke does not block communication between a sensor and a corresponding active wireless communication unit. It should furthermore be realized that the active wireless communication units may be placed at vertical walls of the enclosure, i.e., between the top and bottom of the enclosure. The transceiver circuitry would in this case be placed outside the vertical wall and the at least one antenna inside the vertical wall. However, this placing may at times lead to the windings and core degrading the quality of communication.

Figure 5:
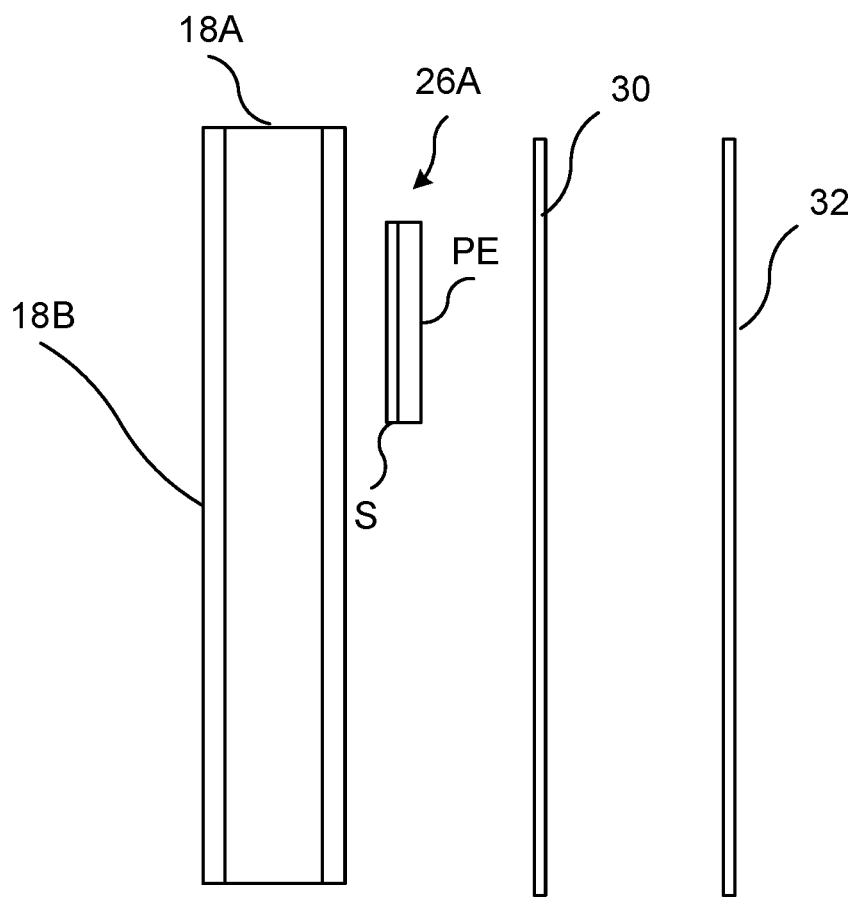
FIG. 5 schematically shows a winding, a wireless sensor and two layers of solid insulation.

FIG. 5 schematically shows one winding, a sensor 26A as well as solid insulation 30 and 32 used in the enclosure.

A winding, such as the outer winding may be an enameled winding. The winding thereby comprises a conductor 18A, such as a conductor of copper or aluminum, that is surrounded by solid insulation 18B, which solid insulation may be formed of a polymer enamel. The at least one winding may thus comprise an enameled winding comprising a conductor surrounded by solid insulation. The at least one sensor may comprise a printed electronic sensor comprising electronics printed on an insulating substrate. A sensor, such as the first sensor 26A, may thus be realized as printed electronics PE on an insulating substrate S, which may also be a flexible substrate. As can be seen the substrate S faces the at least one winding and thereby also faces the solid insulation 18B of the winding. The sensor 26A may be directly attached to the winding 18. Through both the sensor 26A and the winding being insulated because of the use of the solid insulation 18B and substrate S, interference from the sensor 26A on the operation of the winding and vice versa is limited. Moreover, through being placed in the vicinity of the winding, the sensor has a limited influence on the electrical field distribution. The risk of the sensor compromising the insulation during operation of the device is thereby also low. If the insulation is insufficient, it is possible with one or more layers of additional solid insulation between the sensor and the enameled winding.

There may additionally be insulation in the enclosure.

As can be seen in the figure, there may be solid insulation 30 and 32 in the transformer. There is thus solid insulation between the two windings of the transformer. Thereby the at least one sensor is placed between the solid insulation and a corresponding winding. This solid insulation 30 and 32 may be realized through the use of sheets of cellulose, such as pressboard or Kraft paper. The different sheets may additionally be joined together using epoxy.

It is additionally possible that the enclosure is completely filled with solid insulation, which may be realized for instance using epoxy.

As an alternative the electromagnetic device may comprise fluid insulation in the enclosure instead of or in addition to the solid insulation. The fluid insulation may comprise liquid and/or gas insulation. The enclosure may in addition to the cellulose based solid insulation be filled with insulating fluid, which as an example may be a liquid such as mineral oil. However also other types of liquids are contemplated, such as ester oils, gas-to-liquid oils, and silicone oils. The fluid insulation may as an alternative be a gas such as SF6. In this case solid insulation placed between the enabled windings may be aramid based instead of cellulose based.

The at least one sensor is provided for sensing at least one property or deficiency of the electromagnetic device. The sensors may thereby be configured to sense at least one physical property or deficiency of the electromagnetic device, which may be a property of or deficiency in the insulation, such as at least one property of the fluid and/or solid insulation. A sensor may as an example be a temperature sensor. Other types of sensors that may be employed are moisture sensors and acoustic sensors. The sensors are all wireless and may use a suitable short-range communication technology such as near field communication (NFC) or radio frequency identification (RFID). The sensors may thereby be passive sensor. The at least one wireless sensor may thus comprise a passive wireless sensor. As the sensors are passive, they do not need any own power source for their operation, but operate triggered and powered by the wireless transmissions of an active communication unit. They may more particularly be provided as tags delivering data when being read by a reader implemented through the active wireless communication unit. In the case of NFC or RFID the active wireless communication unit may thus be a reader configured to read the tags of the passive sensors.

As an alternative also the sensors may be active. The at least one wireless sensor may thereby additionally or instead comprise an active wireless sensor. In this case the sensors may be equipped with energy harvesting units. In this case there may thus be provided an energy harvesting unit connected to and configured to power a corresponding active wireless sensor. The power for operating the sensors may thereby be obtained through harvesting of energy like electrical field strength and vibrational energy inside the enclosure. In this case also other types of wireless communication may be used, such as WiFi or Bluetooth, like Bluetooth Low Energy (BLE).

Figure 6:
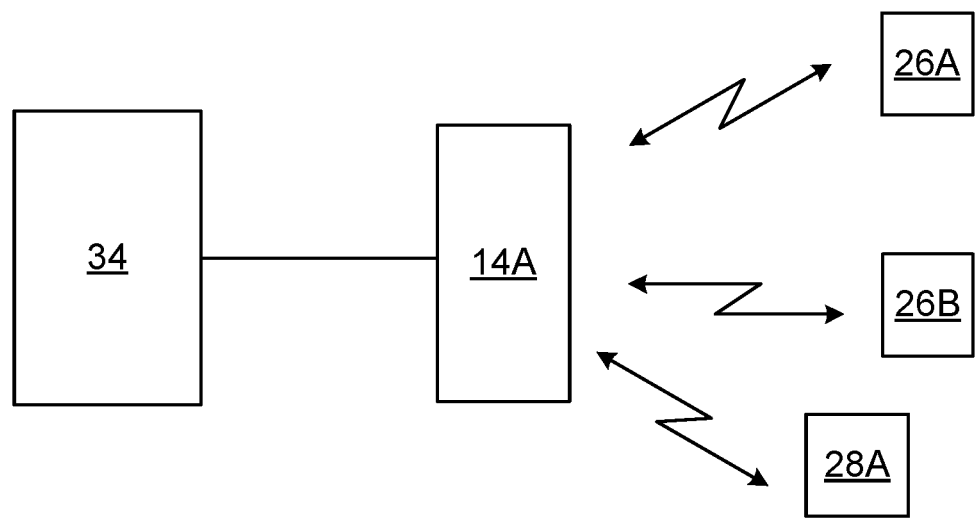
FIG. 6 schematically shows a measuring control unit communicating with an active wireless communicating unit, which in turn communicates with a number of wireless sensors.

As can be seen in FIG. 6, a number of sensors may communicate wirelessly with an active communication unit, which in turn may communicate with a measuring control unit 34. As an example, two sensors 26A and 26B in the first group and one sensor 28A in the second group may communicate with the first active wireless communication unit 14A, where the sensors that are to communicate with the active wireless communication unit 14A may be sensors in an area of the winding structure assigned to the active wireless communication unit and that are not visually blocked from the active wireless communication unit by the first yoke. The connection between the active wireless communication unit and the measuring control unit 26 may be wired or wireless. The wireless communication is in this case not restricted to short-range communication. As an alternative to wired and wireless communication also optical communication can be used. Electrical power for the active wireless communication unit may in this case also be no issue. As was stated above and as can also be seen in FIG. 6, the communication between the active communication unit 14A and the sensors 14, 16, 18 and 20 is wireless.

Sensor measurements that may be of importance during operation of the electromagnetic device are temperature measurements of the insulating fluid. Such temperatures are traditionally measured as top oil measurements close to the top of the enclosure. However, there may be temperatures in other areas in the enclosure that may be more important to measure. A winding can be considered to act as an immersion heater in the fluid. It may for this reason be important to measure hot spot temperatures in the fluid insulation being caused by the windings, such as hot spot temperatures of the fluid insulation caused by the outer winding. Such temperatures are easily measured through placing temperature sensor at suitable positions on the windings. A hot spot may as an example appear at the top of the outer high voltage winding, where the top in this case is a top in the vertical direction. These temperatures may be continuously measured during operation of the electromagnetic device and communicated to the measuring control unit.

It is also possible that the insulation degrades during operation, such degradation may be caused by partial discharges in the insulation. These partial discharges may be measured using acoustic sensors.

Another property that may be measured is moisture. Moisture can be measured during production of the electromagnetic device and may be indicative of any faults in the production. It may also be measured during operation.

The sensors can also be used for gas analysis and/or chemical analysis.

As can be seen there are a number of properties and deficiencies that can be measured both during production and operation, which improves the quality of the final product as well as improves safe operation.

For this reason, a sensor need not be attached to a winding. It may be placed anywhere in the enclosure, for instance on solid insulation or on a part of the core such as the yoke.

The active wireless communication unit of the given example comprised two antennas. An antenna may in this case be a directional antenna directed towards one or more of the sensors in the area covered by the active wireless communication unit. The at least one antenna may thereby be directed towards at least one corresponding sensor. At most each sensor may communicate with a corresponding antenna. Through using directional antennas, it is possible to improve the communication efficiency. Another way in which communication efficiency may be improved is through optimizing the distance between sensor and winding conductor.

The various properties and deficiencies being described earlier were temperature, moisture and partial discharges. It should be realized that also other properties and deficiencies are possible to measure. It may for instance also be possible to measure electrical properties.

The measuring control unit described earlier may be implemented using software running on a processor. It may as an alternative be realized through dedicated integrated circuits such as Application-Specific Integrated Circuits (ASICs) or Field-Programmable Gate Arrays (FPGAs).

From the foregoing discussion it is evident that the present disclosure can be varied in a multitude of ways. It shall consequently be realized that the present disclosure is only to be limited by the following claims.

The invention claimed is:

1. An electromagnetic device comprising:
   an enclosure,
   at least one winding in the interior of the enclosure,
   at least one wireless sensor for sensing at least one property or deficiency of the electromagnetic device, and
   at least one active communication unit comprising transceiver circuitry and at least one antenna,
   wherein the transceiver circuitry is placed on the exterior of the enclosure and the least one antenna is placed inside the enclosure for communication with the at least one sensor,
   wherein the at least one sensor comprises at least one sensor attached to the winding, and
   wherein the at least one sensor attached to the winding is a printed electronic sensor comprising electronics printed on an insulating substrate, where the insulating substrate faces the at least one winding.

2. The electromagnetic device according to claim 1, wherein said enclosure is a metallic enclosure.

3. The electromagnetic device according to claim 1, wherein the at least one winding comprises an enameled winding comprising a conductor surrounded by solid insulation.

4. The electromagnetic device according to claim 1, wherein the at least one winding is surrounded by insulation.

5. The electromagnetic device according to claim 4, wherein the insulation comprises solid insulation and wherein the at least one sensor is placed between the solid insulation and a corresponding winding.

6. The electromagnetic device according to claim 4, wherein the insulation comprises fluid insulation in the form of a gas and/or a liquid.

7. The electromagnetic device according to claim 4, wherein said at least one sensor is configured to measure a property or deficiency of said insulation.

8. The electromagnetic device according to claim 1, wherein the at least one antenna is directed towards at least one corresponding sensor.

9. The electromagnetic device according to claim 1, wherein the at least one active communication unit is placed at the top of the enclosure and said at least one sensor comprises a sensor placed at a top end of a winding, which top end is closest to said active communication unit.

10. The electromagnetic device according to claim 1, further comprising a core with a yoke, where the core defines a central axis around which said at least one winding is wound and the yoke extends in a direction at right angles to the central axis thereby dividing a winding structure formed by the at least one winding in two halves and the at least one active wireless communication unit and at least one sensor with which it is to communicate are displaced from and placed at the same side of the yoke in the direction of the yoke.

11. The electromagnetic device according to claim 1, wherein the at least one antenna is cast in a material able to withstand high temperatures, for instance of up to about 170° C.

12. The electromagnetic device according to claim 1, wherein the at least one wireless sensor comprises a passive wireless sensor.

13. The electromagnetic device according to claim 1, wherein the at least one wireless sensor comprises an active wireless sensor and further comprising an energy harvesting unit connected to and configured to power said active wireless sensor.

* * * * *